United States Patent [19]
Kullmann et al.

[11] 3,900,809
[45] Aug. 19, 1975

[54] ABSORPTION APPARATUS FOR ADJACENTLY DISPOSED MAGNET COILS

[75] Inventors: Dieter Kullmann, Langenzenn; Helmut Marsing, Neunkirchen A. B., both of Germany

[73] Assignee: Siemens Aktiengesellschaft, Munich, Germany

[22] Filed: June 27, 1974

[21] Appl. No.: 483,525

[30] Foreign Application Priority Data
July 5, 1973 Germany.......................... 2334251

[52] U.S. Cl............................. 335/216; 174/DIG. 6
[51] Int. Cl............................................. H01f 7/22
[58] Field of Search ........ 335/216, 299; 174/DIG. 6

[56] References Cited
UNITED STATES PATENTS

| | | | |
|---|---|---|---|
| 3,389,353 | 6/1968 | Kafka et al. | 335/216 |
| 3,391,288 | 7/1968 | Kafka | 335/216 X |
| 3,480,895 | 11/1969 | Albrecht et al. | 335/216 X |
| 3,736,539 | 5/1973 | File et al. | 174/DIG. 6 X |
| 3,781,733 | 12/1973 | Heim | 335/216 |

*Primary Examiner*—G. Harris
*Attorney, Agent, or Firm*—Kenyon & Kenyon Reilly Carr & Chapin

[57] ABSTRACT

A force absorption apparatus for a plurality of adjacently disposed magnet coils between which forces interact wherein each coil is disposed in a low-temperature coolant tank which is surrounded by a vacuum housing at normal temperature. The improvement of the invention comprises means for providing a force-transmitting coupling between adjacent coolant tanks in a direction at least approximately parallel to the forces applied to the magnet coils which includes at least one first support member coupled to the coolant tank and movable axially along the longitudinal axis thereof, and at least one second support member, coupled to the vacuum housing and movable axially with respect to the first member, disposed axially adjacent the first support member for engagement therewith.

11 Claims, 2 Drawing Figures

ABSORPTION APPARATUS FOR ADJACENTLY DISPOSED MAGNET COILS

BACKGROUND OF THE INVENTION

1. Field of the Invention

This invention relates generally to a force absorption apparatus for a plurality of magnet coils between which forces interact, which includes means for establishing a force-transmitting connection between adjacent coolant tanks in which the magnet coils are disposed.

2. Description of the Prior Art

Magnet coils using low-temperature cooled conductors, including superconductors, are particularly suitable for generating large magnetic fields. Superconducting magnet coils must be utilized in fusion reactors, whose strong magnetic fields function to hold together hot plasma and thereby enable fusion to take place in the plasma. In one known fusion reactor system, forty individual magnets are arranged relative to a torus to confine or thermally insulate hot gases; such an arrangement is known as a "stellarator" in plasma physics. Normally, no forces (theoretically) interact between the magnets of a stellarator along the longitudinal axis of the magnet system, i.e., parallel to the torus core. However, when one or more magnets fail, are quenched, or when the arrangement of the magnets is irregular (such as when a magnet moves from its correct position) strong magnetic forces are produced longitudinally with respect to the magnet system as a result of an asymmetric field distribution between the magnets, and the magnet system is compressed by a strong, axially oriented force directed parallel to the torus core. If the field configuration is linear, corresponding mutual force conditions are produced between the magnets and the magnet coils when they are energized in the same sense thereby attracting each other strongly. The forces produced act directly on the coils disposed at each end of the magnet arrangement, but are propagated over the entire length of the arrangement if the magnet coils are braced against each other.

The described forces must be absorbed by means of specially fabricated force absorption devices in order to prevent shifting of the magnets with respect to each other as long as the magnets are in an energized condition. Moreover, when low temperature cooled conductors, especially superconductors, are utilized, the magnet coil windings must directly contact a coolant such as liquid helium. Thus, the windings must be enclosed by one or more coolant tanks which circulate the coolant, and in addition, to prevent heat in-flow, the tanks must also be enclosed by vacuum chambers.

Two types of pressure support members are generally used as force absorption devices between such energized magnets. In the first type, known as "cold" supports, the magnets are disposed in either separate or common coolant tanks, and are enclosed by a single vacuum housing in which the magnet coils are mechanically connected to each other. Such connections may be utilized even during cooling, and heat inflow from outside is kept at a relatively low level. Systems using such cold supports are, however, characterized by poor flexibility. For example, each magnet must be heated individually for the assembly, disassembly or repair thereof. Moreover, when an arrangement utilizing a common coolant tank for the magnets is used, the diameter of the torus arrangement cannot be altered by adding or removing magnets, and the system cannot be changed to a linear arrangement.

Demand for a simpler and more easy method of assembling magnet coils and, in particular, demand for variability of the field geometry, led to the division of the magnet system into separate and independent magnet units, such as those used in water-cooled coils which each have a separate vacuum housing. As a result, however, when several of such units are combined, interacting magnetic forces must be transmitted by means of the external, warmer vacuum housing walls. So-called "warm" supports are utilized in such systems as a force absorption device, and are each disposed between the vacuum housing and the coolant tank enclosing the magnet coil. However, if the coolant tank is cooled to the temperature of a cryogenic medium, the supports no longer provide a positive coupling between the coolant tank and the vacuum housing due to contraction of the coolant tank and the supports. In addition, large heat transfer losses are associated with such warm supports, especially if they are designed to absorb relatively large forces. It is thus desirable for a force absorption device to have the advantages of cold and warm supports, produce a positive connection between the coolant tank and the vacuum housing of the system, and, at the same time, enable easy assembly or modification of the magnet arrangement and keep heat transfer to a minimum.

SUMMARY OF THE INVENTION

It is therefore an object of this invention to provide an improved force absorption apparatus which overcomes the aforementioned disadvantages of heretoforeknown devices.

This and other objects are achieved in a force absorption apparatus for a plurality of adjacently disposed magnet coils between which forces interact, each of which coils are disposed in a low-temperature coolant tank which is surrounded by a vacuum housing at normal temperature. The improvement comprises means for providing a force-transmitting coupling between adjacent ones of the coolant tanks, which means comprises at least one first support member, coupled to the coolant tank, and movable axially along the longitudinal axis thereof, and at least one second support member, coupled to the vacuum housing and movable axially with respect thereto, disposed axially adjacent the first support member for engagement therewith. The advantages of the inventive force absorption apparatus is that shrinkage differences produced by cooling of the magnet coils and their supports are equalized, and the absorption device absorbs relatively large forces but little heat. When the magnet coils are disposed in their "stand-by" condition, that is, are cooled to a low temperature but are not energized, the heat transfer through the force absorption apparatus is negligible.

These and other features of the inventive apparatus will be described in further detail in the following detailed description.

DETAILED DESCRIPTION

Figure 1:
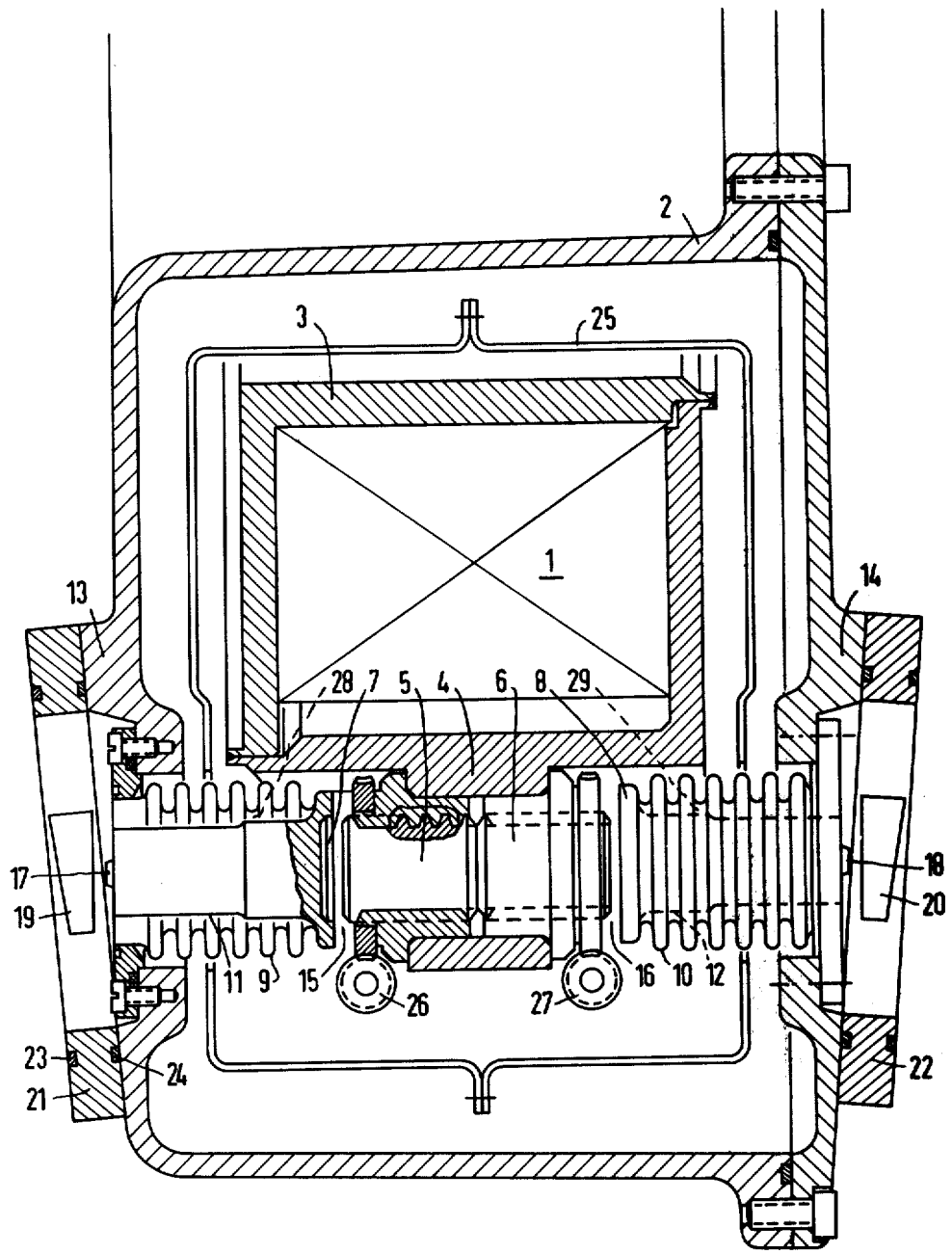
FIG. 1 is a diagrammatic cross-sectional view of one embodiment of a force absorption apparatus constructed according to the invention.

Referring now to the drawings, and in particular to FIG. 1, there is shown a magnet 1 disposed in a vacuum housing 2 which forms part of a stellarator arrangement. The magnet coil body, not shown in the drawings, is disposed in a vacuum-tight coolant tank 3 which contains a cryogenic medium, such as helium, and which is enclosed by vacuum housing 2. A pair of first support members 5 and 6 are mounted on a central part 4 of coolant tank 3, and are axially movable parallel to the direction of the magnetic forces interacting between magnet 1 and a plurality of adjacent magnets (not shown in the drawing). Each magnet support element is movable for engagement with bases 7 and 8 of a pair of vacuumtight spring bellows 9 and 10 coupled to outside walls 13 and 14 of vacuum housing 2. Second support members 11 and 12 are disposed within bellows 9 and 10 and are coupled to bases 7 and 8, and serve as an extension of the support members 5 and 6 perpendicular to walls 13 and 14 of vacuum housing 2 in a direction parallel to the direction of the interacting forces. Support members 11 and 12 extend outwardly from the vacuum housing through apertures provided in the vacuum housing walls 13 and 14, and bellows 9 and 10 are compressed when support members 5 and 6 engage bases 7 and 8 which are spaced apart therefrom by gaps 15 and 16. End members 17 and 18 of support members 11 and 12 engage suitable recesses provided in spacer wedges 19 and 20. The wedges are disposed between a pair of annular spacers 21 and 22 interposed between vacuum housing 2 and the vacuum housing of an adjacent magnet in a vacuum-tight manner. Annular sealing rings 23 and 24 are provided in spacer members 21 and 22 to establish a vacuum tight seal between the spacer members and the vacuum housing. As noted previously, vacuum housing 2 is disposed at room temperature, while coolant tank 3 is disposed at a low temperature, such as that of liquid helium. To keep heat inflow to a minimum, a vacuum is established about coolant tank 3 within vacuum housing 2, and a radiation shield 25 (which may be nitrogen-cooled) is disposed between coolant tank 3 and vacuum housing 2.

In operation, when the magnets of the magnet arrangement are in a deenergized condition, no forces act upon magnet coil 1, and support members 5 and 6 are disposed in their retracted position, i.e., they are disengaged from contact with support members 11 and 12. In this so called "stand-by" condition, heat inflow into coolant tank 3 through bellows 9 and 10 (which are coupled to radiation shield 25) is prevented due to the formation of gaps 15 and 16. When the system magnets are energized, support members 5 and 6 are moved axially in opposite directions until they engage bases 7 and 8 of bellows 9 and 10. The bellows are thus compressed, and support members 11 and 12 interlock with wedges 19 and 20, so as to establish a force-transmitting coupling between magnet coil 1 and magnets adjacent thereto. A drive means for adjusting the position of support members 5 and 6 may comprise a drive shaft which extends inwardly into vacuum housing 2, a differential coupled thereto, and a pair of worm gears 26 and 27 which engage gear teeth provided on support members 5 and 6. After positioning of coolant tank 3, support members 5 and 6 can be moved into engagement with support members 11 and 12 so as to compress bellows 9 and 10 uniformly. The worm gearing of the drive system prevents counterrotation of the drive shaft of the drive means.

One significant advantage of the apparatus of the invention is that support members 11 and 12 and wedges 19 and 20 are cooled to low temperatures, even to that of support members 5 and 6, after the force-transmitting coupling between adjacent magnets is established. Thus, upon the establishment of such a coupling, heat inflow loss through support members 5 and 6 takes place for the most part only through bellows 9 and 10. Since the cross-sectional area of the bellows is small in comparison to the cross-sectional area of support members 11 and 12, and since the corrugated shape of the bellows provides a relatively long heat conduction path, heat influx loss is kept to a minimum.

Bellows 9 and 10 are preferably fabricated from a thin-walled metal such as sheet steel. The heat conductivity of support members 11 and 12 is relatively unimportant, but since deterioration of the vacuum in the vacuum chambers 28 and 29 which surround these members is possible, it is preferable that the support members be fabricated from material of high compressive strength and low heat conductivity, such as, for example, plastic reinforced by metal or fiberglass.

A fixed mounting of wedges 19 and 20 is not illustrated in detail in the drawing. Such a mounting may be effected, however, by, for example, a pipe or the like extending externally through a slide seal provided in spacers 21 and 22.

Figure 2:
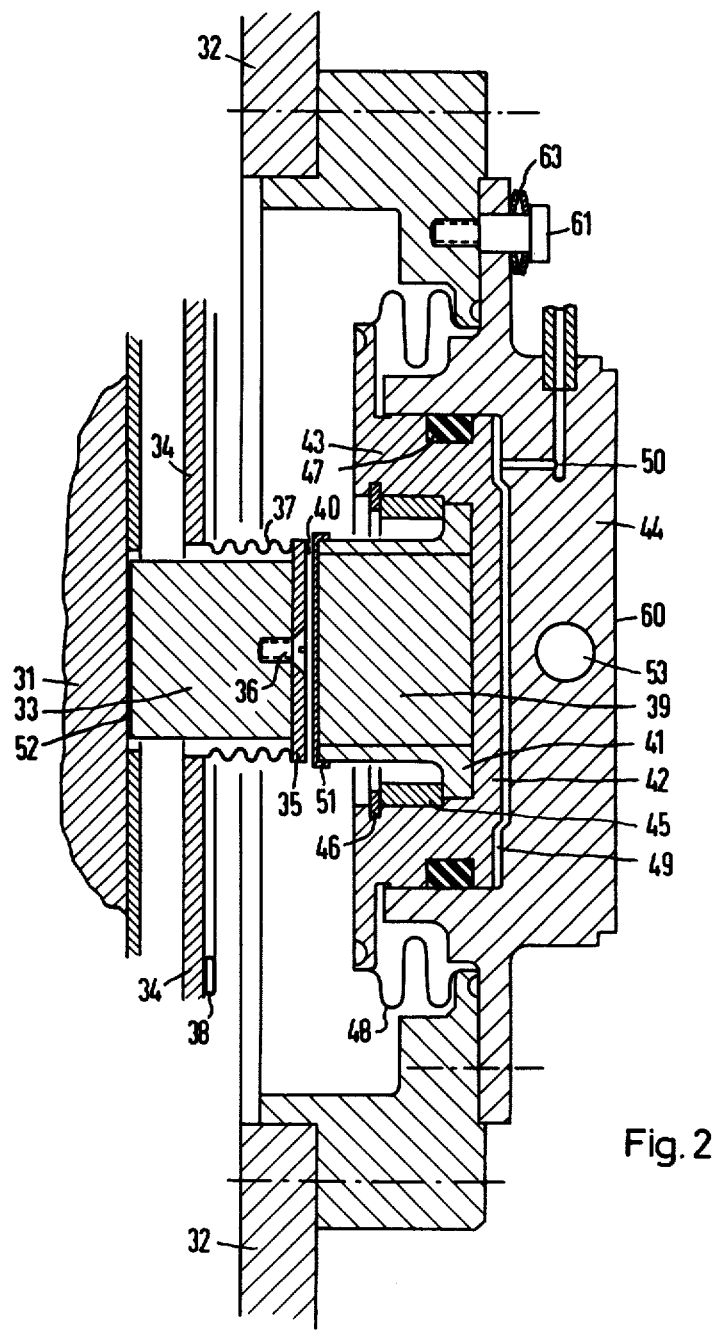
FIG. 2 is a diagrammatic cross-sectional view of another embodiment of a force absorption apparatus constructed according to the invention.

FIG. 2 illustrates another embodiment of the invention including a coolant tank 31 and a vacuum housing 32 which surrounds the coolant tank. The walls of coolant tank 31 and vacuum housing 32 are shown only in partial form in the drawing for the purposes of clarity. At least two force absorption devices are necessary to position coolant tank 31 in vacuum housing 32. One wall of coolant tank 31 is engaged by a plunger like first support member 33 which is slidable along the wall, and a radiation shield 34, which encloses coolant tank 31 and is spaced apart therefrom, is rigidly joined to the support member by a bearing surface and screw 36. Bearing surface 35 is preferably fabricated from high thermally conductive and high strength material, and forms part of radiation shield 34.

Shield 34 completely encloses the upper portion of support member 33, and those parts thereof which laterally surround support member 33, are fabricated as a spring bellows 37. The shield may, for example, be cooled by liquid nitrogen which flows through a coiled tube 38 attached thereto. Another support member 39 is disposed opposite surface 35 a distance 40 therefrom and is slightly larger in dimensions. Base 41 of support member 39 has an expanded base area, and is rigidly fixed to the bottom 42 of a cylindrical piston 43 by means of a hollow, cylindrical shaped adaptor 45 which contacts an inside surface of piston 43 and a retaining ring 46 disposed in a groove provided therein. The piston extends outwardly from a pressure cylinder 44 concentrically disposed thereabout, and a high-pressure packing 47 is provided in the annular gap between piston 43 and pressure cylinder 44. The outer end of piston 43 is coupled to vacuum housing 32 by means of a vacuum-tight spring bellows 48 fabricated, for example, from sheet metal.

High pressure fluid is pumped through a supply line 50 into a chamber 49 between bottom 42 of piston 43 and pressure cylinder 44. Due to the admission of the fluid, chamber 49 expands towards the coolant tank 31, which expansion causes a slidable sleeve 51 (fabricated, for example, of sheet metal and fastened to the surface of support member 39) to engage bearing surface 35 of support member 33 and establish a force-transmitting coupling to coolant tank 31. Sleeve 51 enables support members 33 and 39 to be moved slightly perpendicular to the direction of the applied forces. Shrinkage differences can, thus, be compensated for. A check valve (not shown in the drawing) may be inserted, if desired, into connecting line 50 to assure that contact pressure is maintained. When piston 43 is released by the hydraulic pressure, it moves back under the force exerted by the compressed spring bellows 48, and reestablishes the gap 40 between bearing surface 35 and sleeve 51 of support member 39. Simultaneously, due to the action of bellows 37 and the reformation of the radiation shield 34, a return motion of support member 33 is also produced, and a narrow gap 52 is formed between member 33 and coolant tank 31. The thermally conductive connection established between support member 33 and coolant tank 31 is thereby broken. It is in this position that the deenergized magnet coil disposed in tank 31 may be cooled to its cryogenic temperature and maintained in a stand-by condition with little heat loss. Only when the magnet coil is energized, and thus applied forces exerted on adjacent magnet coils are produced, is fluid admitted to chamber 49 and a positive, force-transmitting coupling between coolant tank 31 and vacuum housing 32 established. It is preferable if support members 33 and 39 are disposed between coolant tank 31 and vacuum housing 32 and oriented in the direction of the force exerted on the magnet coil to reduce heat influx losses, members 33 and 39 are preferably fabricated from high-strength plastic materials having low heat conductivity characteristics. A controlled heater 53 may be provided in pressure cylinder 44 to prevent impairment of the viscosity of the pressure fluid in chamber 49 due to the cooling of support member 39 which is in direct contact with cooled radiation shield 34. Vacuum-tight bellows 48 also serves to prevent fluid leakage through high pressure packing 47 between the piston and the cylinder wall further than the interior space of the bellows.

It is also preferable to absorb counterforces acting on outside surface 60 of pressure cylinder 44. This may be effected by another force absorption apparatus disposed laterally with respect to surface 60 in mirror-symmetry to the apparatus shown in the drawing. If the pressure cylinders are made slightly movable in the counterforce direction, their outside surfaces may move towards each other and engage in a force-transmitting manner. It is thus preferable to fasten pressure cylinder 44 to vacuum housing 32 in several places by means of springs and screws. The drawing illustrates only one such fastening arrangement which includes a screw 61 extending through an aperture in pressure cylinder 44 fastened to vacuum housing 32. A cup-type spring 63 is inserted between the screw head and the top side of pressure cylinder 44 and enables pressure cylinder 44 to move outwardly away from the wall of vacuum housing 32, when the hydraulic system is loaded, until a force-transmitting coupling with an adjacent magnet is established. The surface engaging outside surface 60 may, for example, be the outside surface of the pressure cylinder of a force absorption apparatus provided for the adjacent magnet. The spring 63 prevents excessive stress of vacuum housing 32 by the absorbed forces, and the latter may thus be of thin-walled design.

During cooling of the magnet coil, contraction of the components of the force absorption apparatus may be different. For example, the vacuum housing retains its normal dimensions since it is disposed at normal temperature. In contrast, support member 33 attached to radiation shield 34, and coolant tank 31, may shift perpendicular to the direction of the applied force due to contraction. The provision of gaps 40 and 52 prevents bending of the components of the absorption apparatus due to such different contractions.

The force absorption apparatus described above may be utilized to space a plurality of separate magnets, each of which is disposed in a separate vacuum housing, either in stellarator arrangements or in Tokamak systems. Besides toroidal geometric arrangements, linear arrangements of such magnets are also common in plasma physics applications, in which superconducting magnet coils are preferably utilized. The interacting forces which act upon such magnet coils may be extremely strong, but the force absorption apparatus of the invention may be effectively used in such applications. Generally speaking, the inventive apparatus may be utilized wherever strong forces interact between components disposed at different temperatures and where the heat exchange between these components must be maintained at a minimum possible level.

In the foregoing specification, the invention has been described with reference to specific exemplary embodiments thereof. It will, however, be evident, that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a force absorption apparatus for a plurality of adjacently disposed magnet coils between which forces interact, each of said coils being disposed in a low-temperature coolant tank which is surrounded by a vacuum housing at normal temperature, means for providing a force-transmitting coupling between adjacent ones of said coolant tanks, comprising:
   at least one first support member, coupled to said coolant tank, movable axially along the longitudinal axis thereof; and
   at least one second support member, coupled to said vacuum housing and movable axially with respect thereto, disposed axially adjacent said first support member for engagement therewith.

2. The means recited in claim 1, further comprising at least one support bellows, coupled to said vacuum housing and said second support member, and disposed axially about said second support member.

3. The means recited in claim 2, wherein said means comprises a pair of oppositely movable first support members, and a pair of oppositely movable second support members each surrounded by a support bellows.

4. The means recited in claim 3, further comprising means for moving said first support members into engagement with said second support members and adjusting the pressure exerted by said first members on said second members.

5. The means recited in claim 4, wherein said moving means comprises mechanical drive means.

6. The means recited in claim 3, further comprising a vacuum chamber formed between adjacent vacuum housings extending into said support bellows and in which said second support members are disposed, and further comprising at least one wedge member, disposed in said vacuum chamber between said vacuum housings surrounding said coils and axially adjacent said second support members for engagement therewith.

7. The means recited in claim 3, wherein said support bellows include a base portion disposed at the ends thereof which are axially adjacent said first support members, with the other ends of said support bellows being coupled to said vacuum housing.

8. The means recited in claim 2, further comprising means for moving said second support member into engagement with said first support member, said first and second support members being movable in the direction of the forces applied to said magnet coils.

9. The means recited in claim 7, wherein said moving means comprises a hydraulic drive means.

10. The means recited in claim 7, wherein said first support member is additionally movable with respect to said coolant tank and said second support member perpendicular to the direction of said applied forces.

11. The means recited in claim 1, wherein said first and second support members are fabricated of material of high compressive strength and low thermal conductivity.

* * * * *